United States Patent [19]

Edenfield

[11] 4,046,221

[45] Sept. 6, 1977

[54] SADDLE SUPPORT

[76] Inventor: Neal M. Edenfield, Rte. 1, Box 178, Grand Ridge, Fla. 32442

[21] Appl. No.: 667,603

[22] Filed: Mar. 17, 1976

[51] Int. Cl.[2] .............................................. F16M 11/00

[52] U.S. Cl. .................................................... 182/155

[58] Field of Search ................ 182/155, 153; 108/130, 108/132, 120

[56] References Cited

U.S. PATENT DOCUMENTS

| | | | |
|---|---|---|---|
| 1,150,938 | 8/1915 | Hensley | 182/155 |
| 1,294,264 | 2/1919 | Herman | 182/155 |
| 1,713,359 | 5/1929 | Thomas | 182/155 |
| 1,935,871 | 11/1933 | Coffed | 182/155 |
| 2,396,737 | 3/1946 | McLaskey | 182/155 |

*Primary Examiner*—Reinaldo P. Machado
*Attorney, Agent, or Firm*—Duckworth, Hobby, Orman, Allen & Pettis

[57] ABSTRACT

A support for saddles or the like includes a pair of rails, each extending substantially parallel one with respect to the other. The support includes a first pair of support legs, which are pivotably mounted at one end of the two rails and are connected so as to be movable together while pivotable on the pin. A second pair of support legs is attached to the opposite end of said rail pair, and includes a double-action pivot hinge which allows the second leg pair to be folded inward toward each other and then pivoted downward against the support rails, such that the entire support may be folded into a compact unit.

8 Claims, 4 Drawing Figures

SADDLE SUPPORT

BACKGROUND OF THE INVENTION

1. Field of the Invention

The present invention relates to supports, and in particular relates to a folding, easily transportable device adapted to support saddles or to serve as a sawhorse and the like.

2. Description of the Prior Art

There are a wide variety of support arrangements contained in the prior art. For example, in U.S. Pat. No. 2,889,185, Heisler discloses a table having foldable legs, in which the legs are adapted to mate in such a manner that they form a compact unit which is readily stacked one on top of another. In the arrangement taught by Heisler, the legs comprise unitary members which are pivotted to the sides of the table.

A somewhat similar arrangement is disclosed in U.S. Pat. No. 2,572,474 to Hamilton. The collapsible table taught by Hamilton also includes legs which are capable of nesting together and forming an easily stackable unit, but in which the legs comprise a single unitary construction which is pivoted along the bottom of the support. In U.S. Pat. No. 910,354, Burlingame discloses an arrangement similar to those described above, and in which the unitary pivotable leg structures are locked in place by the use of V-shaped braces which are adapted to fit within a spring catch thereby holding the legs in one of two positions. Another arrangement like that of Burlingame is disclosed by York in U.S. Pat. No. 159,737.

In U.S. Pat. No. 3,261,112, Gray discloses a knockdown table in which the two pairs of support legs are again formed in a unitary construction, and which are capable of being nested due to an offset design between the two leg pairs.

In U.S. Pat. No. 1,959,725, Lindsay discloses a nestable folding table, in which the legs have a unitary construction, but are foldable one pair of legs on top of the other. In U.S. Pat. No. 1,600,823, Hess teaches a folding bench having a metal leg structure in which the legs are formed of unitary pairs which are foldable against the bottom of the support structure. A similar arrangement is disclosed by Lion U.S. Pat. No. Des. 142,171.

While all of the above-described prior art structures enable the two pairs of support legs to be folded against the support structure, these arrangements are unsuitable for certain uses. For example, it is often desirable for a horseman in the field to remove the saddle from his horse, while resting or camping. In order to prevent the undersides of the saddle from becoming soiled, it is desirable to place the saddle on a support which is capable of withstanding the heavy weight of the saddle, and yet is also capable of being folded into a compact, flat unit which can be transported in an accompanying vehicle.

SUMMARY OF THE INVENTION

The present invention is a support adapted for saddles or the like, and comprises a pair of rails extending substantially parallel with respect to each other, and a first pair of support legs which are pivotably pinned at one end between said rails, and are pivotable to a support position which is substantially normal to the rails. The pivoting means is connected adjacent to both of the rails for coupling the two legs together at one end thereof, and for allowing the legs to be moved together wherein the legs are foldable into a first plane.

The preferred embodiment of the support structure includes a second pair of support legs, a first one of the second leg pair being coupled to an end of one of the rails and the other of the legs in the second pair being coupled to the other rail, the second pair of legs being pivotably connected between the opposing end of the two rails by a double-action hinge, so as to be pivotable toward each other and thence against each corresponding rail and in the first plane so as to form a compact, flattened arrangement.

THE DRAWING

DETAILED DESCRIPTION

A preferred embodiment of the present invention is shown in FIGS. 1–4 and described with reference thereto.

The support of the present invention, referred to generally as 10, includes a pair of support rails 12, 14 which extend substantially parallel to each other with rigid cross members 15, 17 positioned between the ends of the two rails. A cushion strip 16 is deposited on the upper surface of the two rails 12, 14. The support 10 is provided with two pairs of support legs, each disposed at opposite ends of the parallel rails 12, 14 and each of which will be described in greater detail below.

Figures 1, 2:
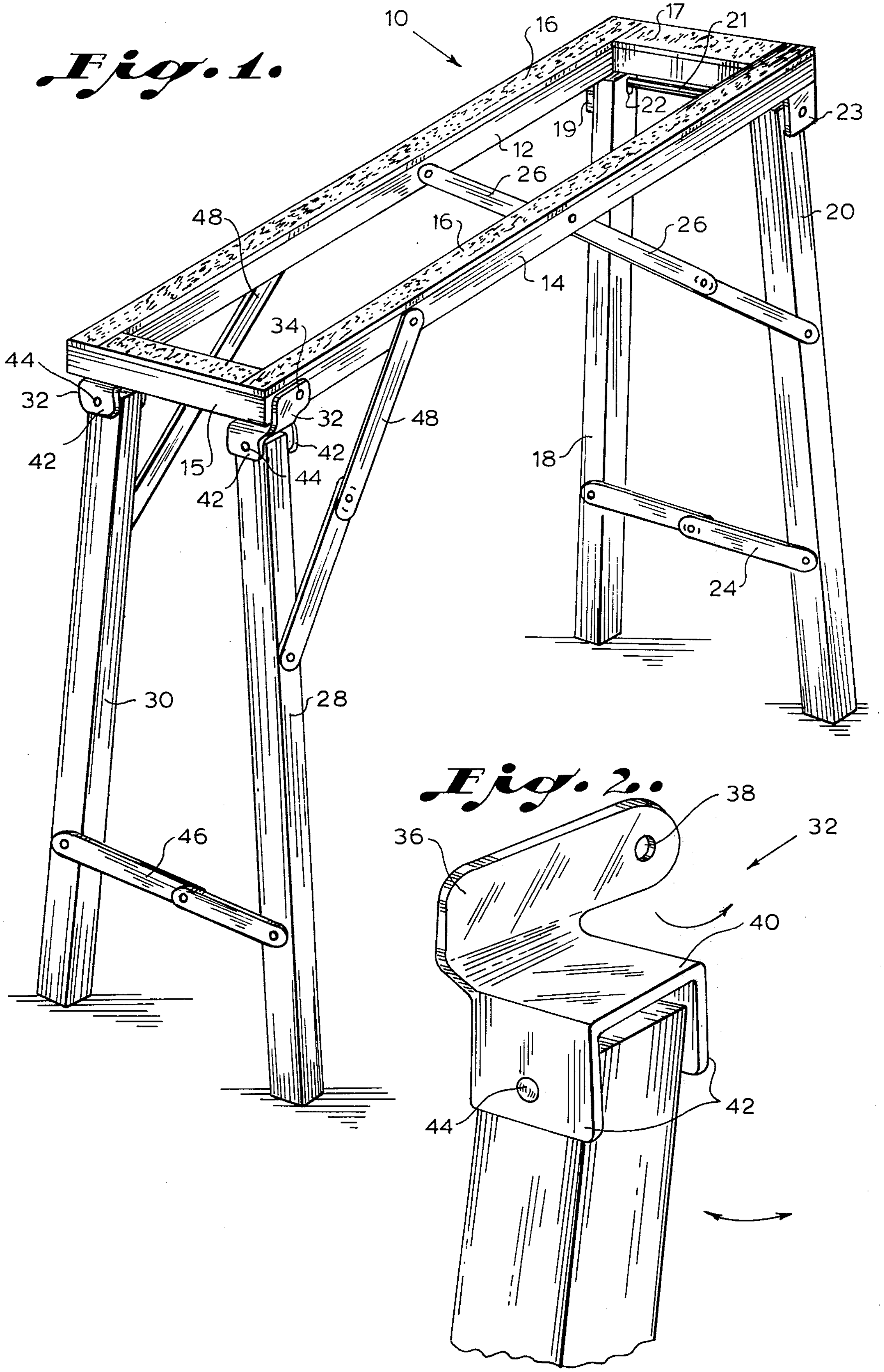
FIG. 1 is a perspective view of the support structure of the present invention.
FIG. 2 is a portion of the structure of FIG. 1.
Figure 3:
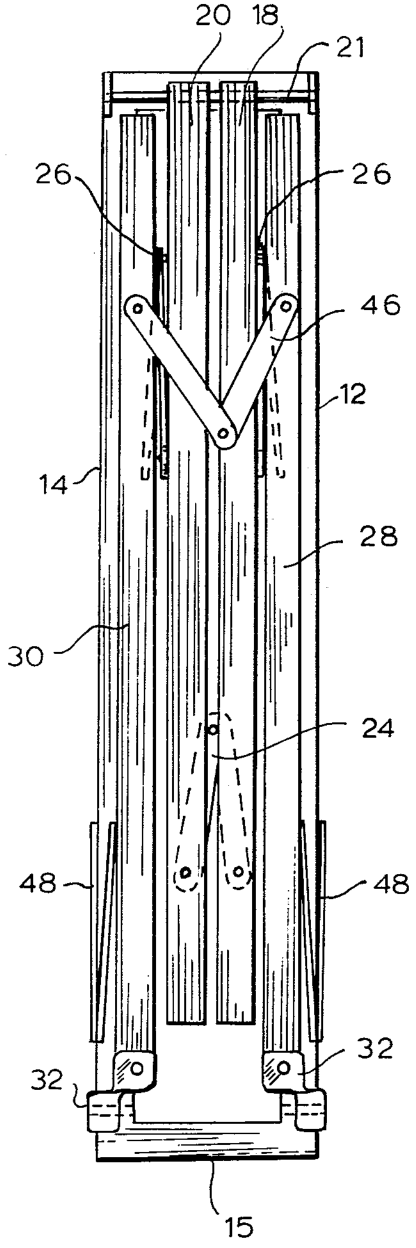
FIG. 3 is a top plan view of the support of FIG. 1, shown in the full folded position.
Figure 4:
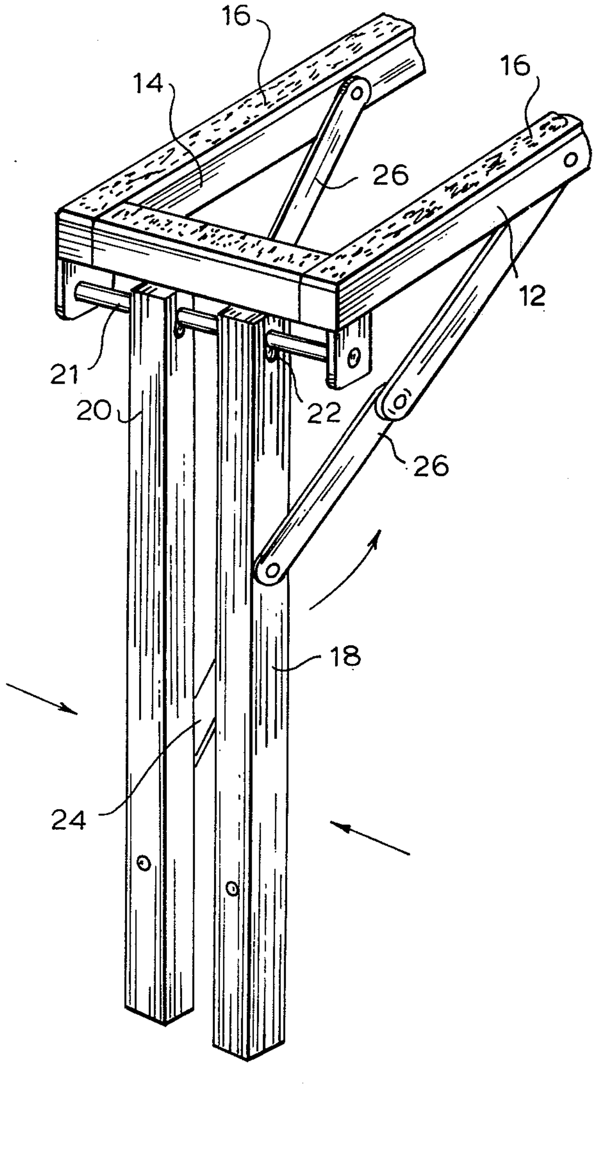
FIG. 4 is a portion of the structure of FIG. 1.

With specific reference to FIGS. 1 and 4, a first pair of the support legs 18, 20 are pivoted on a pin 21 extending between two tabs 19, 23 at the respective ends of the rails 12, 14 adjacent the rigid transverse member 17. Each of the legs 18, 20 are provided with an oversized opening 22 through which the pivot pin 21 extends. A first folding bracket 24 is provided, and is pivotably pinned at each end to one of the support legs 18, 20 between the ends thereof, and preferably towards the bottom of that pair of support legs. A pair of side brackets 26 are each pinned at one end to the outside of one of the support legs 18, 20 and at the other end to the inside of the corresponding one of the support rails 12, 14 as is more clearly shown in FIG. 4.

The second pair of support legs will now be described with reference to FIGS. 1 and 2. The second pair of support legs 28, 30 are joined to a respective one of the support rails 14 by a double action hinge 32, which is more clearly shown in FIG. 2. Each hinge 32 includes a vertical flange 36 with an aperture 38 extending therethrough. A pivot pin 34 (note FIG. 1) extends through the aperture 38 so as to pivotably join the flange 36 to an outward-facing vertical side of the corresponding support rail 14, 12. The double action hinge 32 further includes a flat, horizontal plate 40 which is joined to the vertical flange 36 and includes two downwardly extending tabs 42 betwen which extends a pivot pin 44 with one end of the corresponding leg 28, 30 pivotably joined thereto. With specific reference to FIG. 1, the second pair of support legs 28, 30 are provided with a crossing support bracket 46, having each end pinned to one of the support legs 28, 30. The second pair of support legs is provided with a pair of upper brackets 48, each of which is pinned between the outward-facing vertical side of the corresponding support rail 14, 12 at one end, and at the other end through the outside of the corresponding one of the support legs 28, 30.

The manner in which the support of the present invention may be easily folded into a compact unit will be described with reference to FIGS. 1–4.

With specific reference to FIG. 4, folding of the support 10 is initiated by moving brackets 24 and 26 into the folding position, and thereafter pushing the two support legs 18, 20 together along the pivot pin 21. When these two legs are in close proximity, they are then folded into a first plane adjacent the two support rails 12, 14.

Now noting FIG. 1, the second pair of support legs is folded against the rails 12, 14 by first moving the brackets 46 and 48 into the folding position. The two support legs 28, 30 are then rotated about the pivot pins 44 in a second plane until they are substantially parallel, and are then rotated about the pivot pins 34 (note FIG. 1) in a third plane until the support legs 28, 30 are resting against the support rails 14, 12 and in the first plane as is clearly shown in FIG. 3.

The support 10 of the present invention thus provides a foldable, easy-to-use support which is very portable and is capable of serving as a sawhorse, saddle rack or the like.

I claim:

1. A support for saddles or the like comprising:

a pair of rails, one rail extending substantially parallel with respect to the other rail;

a first pair of support legs;

a first foldable brace between said first pair of legs;

means connected to both of said rails for sliding and pivoting said first pair of legs together, such that said first pair of legs are foldable into a first plane adjacent to said two rails;

a second pair of support legs, a first one of said second leg pair coupled to an end of one of said rails and the other of said legs in said second pair coupled to an end of said other rail, said second leg pair coupled to said rails and ends thereof opposing said first leg pair;

a second foldable brace between said second pair of legs;

a double-action pivot hinge connecting each leg of said second pair to the corresponding rail for pivoting each said leg of said second pair both in a second plane transverse to said first planes, each leg of said second leg pair being pivotable in said second plane about a pivot axis passing through the corresponding rail; and wherein said second pair of support legs are foldable into said first plane with said first leg pair positioned there between, both said leg pairs and said second brace being dimensioned such that said second brace overlies said first leg pair when said leg pairs are folded in said first plane, whereby said first leg pair must be folded into said first plane prior to folding of said second leg pair into said first plane.

2. A support as recited in claim 1 wherein said sliding means comprises a pivot pin lying in said first plane and between said two rails.

3. A support as recited in claim 1 further comprising means for limiting rotational movement of said first pair of legs in a direction away from said first plane.

4. A support as recited in claim 3 wherein said movement limiting means comprises a bracket between one of said rails and one of said legs of first pair.

5. A support as recited in claim 4 wherein said bracket is coupled at one end to the inside of said one rail and to the outside of said one leg of said first pair.

6. A support as recited in claim 5 wherein said movement limiting means further comprises another bracket coupled between the inside of the other of said two rails and the outside of the other of said two legs of said first pair.

7. A support as recited in claim 1 further comprising means for limiting movement of each leg in said second leg pair away from the corresponding rail.

8. A support as recited in claim 7 wherein said movement limiting means comprises a strut between each leg of said second leg pair and the corresponding rail.

* * * * *